(12) United States Patent
Korovkin et al.

(10) Patent No.: US 7,788,321 B2
(45) Date of Patent: Aug. 31, 2010

(54) COLLECTING DEFAULT USER SETTINGS FOR A WEB APPLICATION

(75) Inventors: Kostyantyn Korovkin, Sammamish, WA (US); Justin Wald, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 869 days.

(21) Appl. No.: 11/512,491

(22) Filed: Aug. 30, 2006

(65) Prior Publication Data

US 2008/0059566 A1 Mar. 6, 2008

(51) Int. Cl.
*G06F 15/16* (2006.01)

(52) U.S. Cl. .................. 709/203; 709/229; 709/219

(58) Field of Classification Search ............ 709/203, 709/217, 219, 225, 229; 370/351, 354
See application file for complete search history.

(56) References Cited

U.S. PATENT DOCUMENTS

| | | | |
|---|---|---|---|
| 5,949,419 | A | 9/1999 | Domine et al. |
| 6,430,739 | B1 | 8/2002 | Ballard |
| 6,442,577 | B1 | 8/2002 | Britton et al. |
| 6,493,733 | B1 | 12/2002 | Pollack et al. |
| 7,012,916 | B2 * | 3/2006 | Low et al. ............... 370/352 |
| 7,028,072 | B1 | 4/2006 | Kliger et al. |
| 7,162,436 | B1 * | 1/2007 | Eckel, Jr. ............... 705/26 |
| 7,454,506 | B2 * | 11/2008 | Dutta ..................... 709/228 |
| 2002/0013850 | A1 * | 1/2002 | Mitchell et al. ........... 709/229 |
| 2002/0078102 | A1 | 6/2002 | Dutta |
| 2002/0152245 | A1 | 10/2002 | McCaskey et al. |
| 2003/0167234 | A1 | 9/2003 | Bodmer et al. |
| 2003/0204815 | A1 | 10/2003 | Edwards et al. |
| 2004/0168184 | A1 * | 8/2004 | Steenkamp et al. ......... 725/31 |

OTHER PUBLICATIONS

"DBabble Customizing the Web Pages", http://www.netwinsite.com/dbabble/templates.htm.
Bonett, Monica, "Personalization of Web Services: Opportunities and Challenges", Date: Jun. 22, 2001, http://www.ariadne.ac.uk/issue28/personalization/.
Okada, et al., "Applying CC/PP to User's Environmental Information for Web Service Customization", http://www10.org/cdrom/posters/1066.pdf#search=%22customize%20web%20page%20%20based%20-in%20user%20preferences%22.

* cited by examiner

*Primary Examiner*—Wing F Chan
*Assistant Examiner*—Ruolei Zong (57) ABSTRACT

A visitor to a web site hosting one or more information services can be presented with default information from those services that is tailored to the visitor based on known information about the visitor. A profile service can instantiate a visitor profile by sending visitor identifying information to the hosted information services and amalgamating the visitor-specific defaults selected by each hosted information service based on the identifying information provided. The default selection process is thereby moved to the individual information services, which are better suited to select defaults, and thereby avoids further complexities in the profile service.

14 Claims, 5 Drawing Sheets

COLLECTING DEFAULT USER SETTINGS FOR A WEB APPLICATION

BACKGROUND

The World Wide Web comprises many different types of websites, including sites that offer products for purchase, sites that provide entertainment, and sites that provide information. Among the latter are websites that provide general information, such as encyclopedic websites, and those that provide user-specific information, such as the prices of stocks the user is interested in, or the weather at the user's location. Generally, such user-specific information is tailored to the user through a setup process by which the user specifies the information that they are interested in.

Websites that provide the user with information that is desirable to the user are likely to be more often visited by the user. The number of times that a user visits a website, multiplied by the number of users of the website, is commonly referred to as the "traffic" for a website. The ability of a website to sell advertising space, and thereby generate income, is dependent on a number of factors, but at least one significant factor is the amount of traffic that the website receives. Thus, high traffic websites tend to generate an increased amount of advertising income.

However, depending on the type of information being provided by the website, and the design of the website itself, the setup process for any given user can be tedious and time-consuming. As a result, some visitors to the website will not undertake the setup process, and not become signed-up users of the website, thereby making it more difficult for the website to determine what information would be useful to them.

One method for enticing visitors to complete the setup process is to provide them with a demonstration of the capabilities of the website. Generally, such a demonstration takes the form of default values that are used in the absence of user-specified values. For example, a website seeking to demonstrate the delivery of financial data can provide, as defaults, the data for common financial indices. If the visitor believes that the website will be useful to them in the future, they may be more likely to undertake the setup process, provide the website with the information that they would like to see presented to them in the future, and thereby become a signed-up user of the website.

SUMMARY

A demonstration of the capabilities of a website may be more compelling to many visitors if the information provided in the demonstration is already somewhat useful to the visitor. Such a more compelling demonstration may be more likely to entice the visitor to undertake the signup process and become a user of the website, thereby increasing the chances that the website will become a high traffic website and generate increased income. Thus, the default values used to provide information to a visitor can be tailored to the particular visitor based on visitor-specific information.

In many cases, a minimum amount of information about the visitor may already be available to the website, such as through a prior registration that the visitor performed with a companion website or other related web property. In such a case, the visitor identifying information that is available can be provided to each information service that is being hosted by the page of the website that the visitor is visiting. Each information service can then select the most appropriate defaults for the visitor, given the visitor identifying information provided by the web page.

Each page of a website can display information provided by one or more information services. When a visitor requests a particular page, visitor identifying information can be provided to the information services hosted by that web page before the page is rendered for the visitor. In one embodiment, the web page uses a centralized profile service to provide the visitor identifying information to each information service that is hosted by the web page. In an alternative embodiment, the centralized profile service is used by the visitor's web browser.

The centralized profile service can provide the visitor identifying information to the information service in a standardized and extensible format. In one embodiment, the visitor identifying information is provided in a query Uniform Resource Locator (URL) using the form specified by an XML (extensible Markup Language) schema. To determine which information services should be provided the visitor identifying information, the centralized profile service can either reference one or more registries correlating each web page of the website and the information services used by that web page, or the centralized profile service can be provided the information directly from the web page or the visitor's web browser.

A website, or a collection of web properties, can use one or more centralized registries to correlate web pages to the information services they host and to store user profile information. By referencing the user profile information, it can be determined whether a visitor has become a registered user and has already specified information they desire from each information service. In such a case, the centralized profile service need not request default values from the information services.

In one embodiment, the centralized profile service references a centralized registry on a periodic basis to determine if a new information service has been added to any of the registered web pages. If a new information service has been added and is being hosted by the web page requested by the visitor, or if the visitor is not a registered user for at least one of the information services hosted by the web page, the centralized profile service can provide the visitor identifying information to those information services for which default values are required.

In some cases, the geographic or governmental market of the website can impact how an information service determines relevant default values. Thus, the centralized profile service can also provide to each information service the market specified by the visitor. In one embodiment the specified market can be determined by the URL country code used to visit the web page.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to providing visitor-specific default values for information services hosted on a web page. If the visitor has previously provided identifying information through a related web site, that identifying information can be used to tailor the defaults used for the information services hosted on the web page the visitor has currently requested. The web server hosting the requested web page can invoke a central profile service to pass the visitor's previously provided identifying information to the information services hosted on the requested web page, receive default values from those information services that are tailored for the visitor, instantiate a visitor profile comprising those visitor-specific defaults, and provide that visitor profile, with the visitor-specific default values to the web server to incorporate into the web page code being delivered to the visitor's browser. Alternatively, the web server hosting the requested web page can utilize the programmatic aspects of the visitor's web browser and direct the web browser itself to communicate with the profile service. In such a case, while the profile service can still collect the visitor's previously provided identifying information, pass it to the relevant information services, receive default values that are tailored for the visitor, and instantiate the visitor's profile with those values, the profile service, rather than providing the collected values to the web server, can instead provide them directly to the visitor's web browser.

The techniques described herein are focused on the behavior of the profile service, in conjunction with one or more information services and the web pages that host these information services, and also on the communications between the web servers, the profile service and the one or more information services. In one embodiment, the web server hosting the web page that the visitor is requesting communicates with the profile service using a standard mechanism, such as HyperText Transfer Protocol (HTTP) requests specifying an appropriately constructed Uniform Resource Locator (URL). The profile service can likewise communicate with the information services using a standard mechanism, such as HTTP requests specifying an appropriately constructed URL. To enable the profile service to provide visitor identifying information to the information services, an extensible mechanism, such as an eXtensible Markup Language (XML) data object, can be used. In one embodiment, the XML data object used by the profile service conforms to an XML schema that can be modified in a straightforward manner to enable the specification of an extensible set of visitor identifying information. An XML data object can likewise be used by the information services to provide visitor-specific defaults to the profile service.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
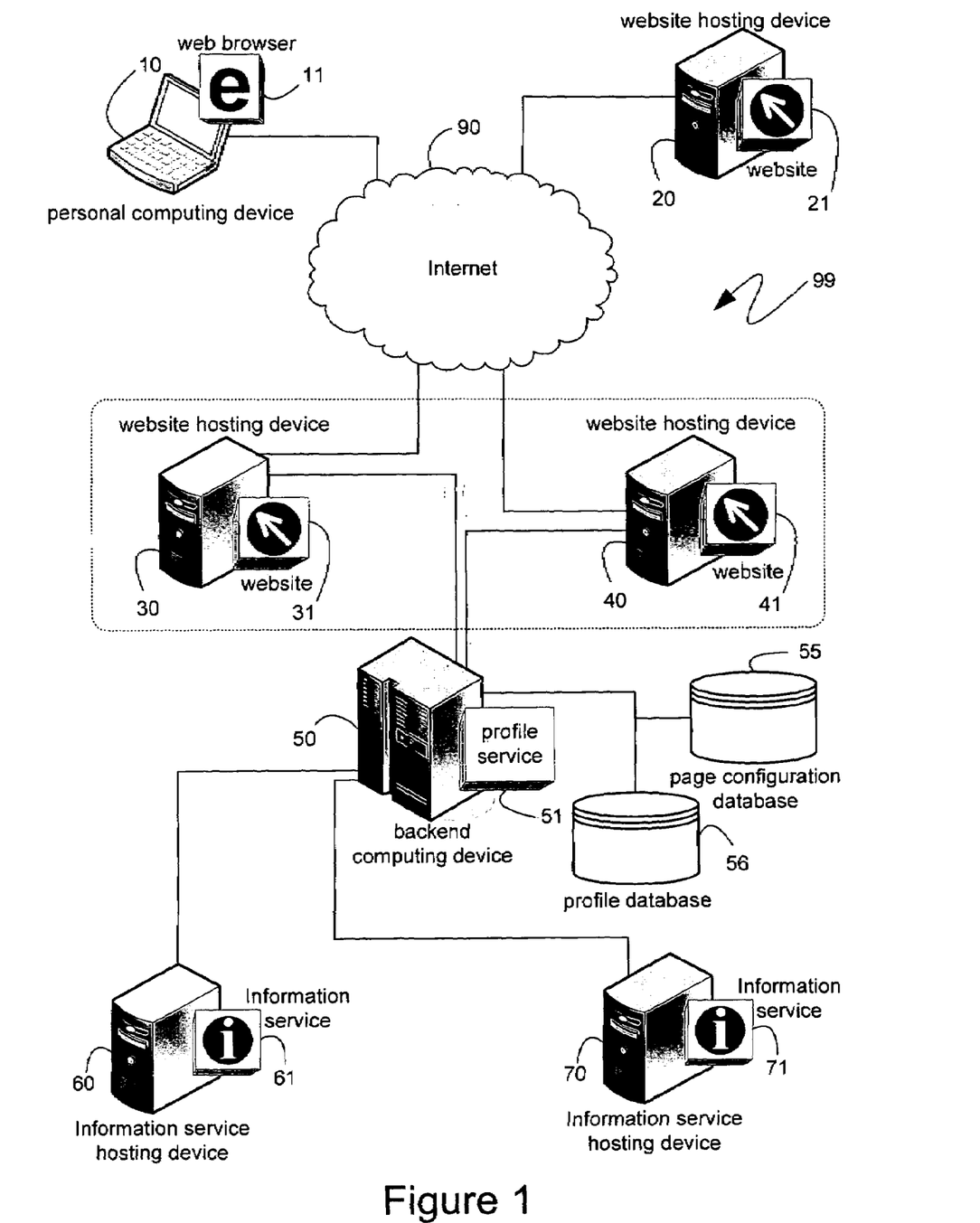
FIG. 1 is a diagram of an exemplary system that provides context for the described functionality.

With reference to FIG. 1, an exemplary system 99 is illustrated, providing context for the descriptions below. The exemplary system 99 can be part of the Internet 90, as illustrated, though the reference to the Internet is strictly an example and is not intended to limit the descriptions to Internet protocols, such as the Transmission Control Protocol (TCP), the Internet Protocol (IP), or any other Internet-specific technology. Exemplary system 99 includes a personal computing device 10 and website hosting computing devices 20, 30 and 40 connected to the Internet 90. Each of the website hosting devices 20, 30 and 40 hosts a website 21, 31 and 41, respectively, which can be browsed from the personal computing device 10 with a web browser 11. More precisely, the various web pages of websites 21, 31 and 41 can be read and displayed by web browser 11. As will be known by those skilled in the art, the collection of websites hosted by computing devices connected to the Internet 90 is commonly referred to as the World Wide Web. However, as with the reference to the Internet itself, the reference to the World Wide Web is strictly exemplary and is not intended to limit the descriptions to HTTP, the HyperText Markup Language (HTML), or any other World Wide Web-specific technology.

FIG. 1 illustrates websites 31 and 41 as being part of the same web property. For example, website 31 can be comprised of web pages directed to financial matters while website 41 can be comprised of web pages directed to sports events. However, all of the web pages of both websites 31 and 41 can share a common interface and can be managed by a centralized administrative entity. In such cases, a user of website 31, who logs on to website 31, may reasonably expect to remain logged on when browsing over to companion website 41. Consequently, information collected by both websites 31 and 41 can be centrally stored and accessed. A centralized backend computing device 50 can provide support to both websites 31 and 41, and can facilitate the performance of tasks that are common to both websites.

Figure 3:
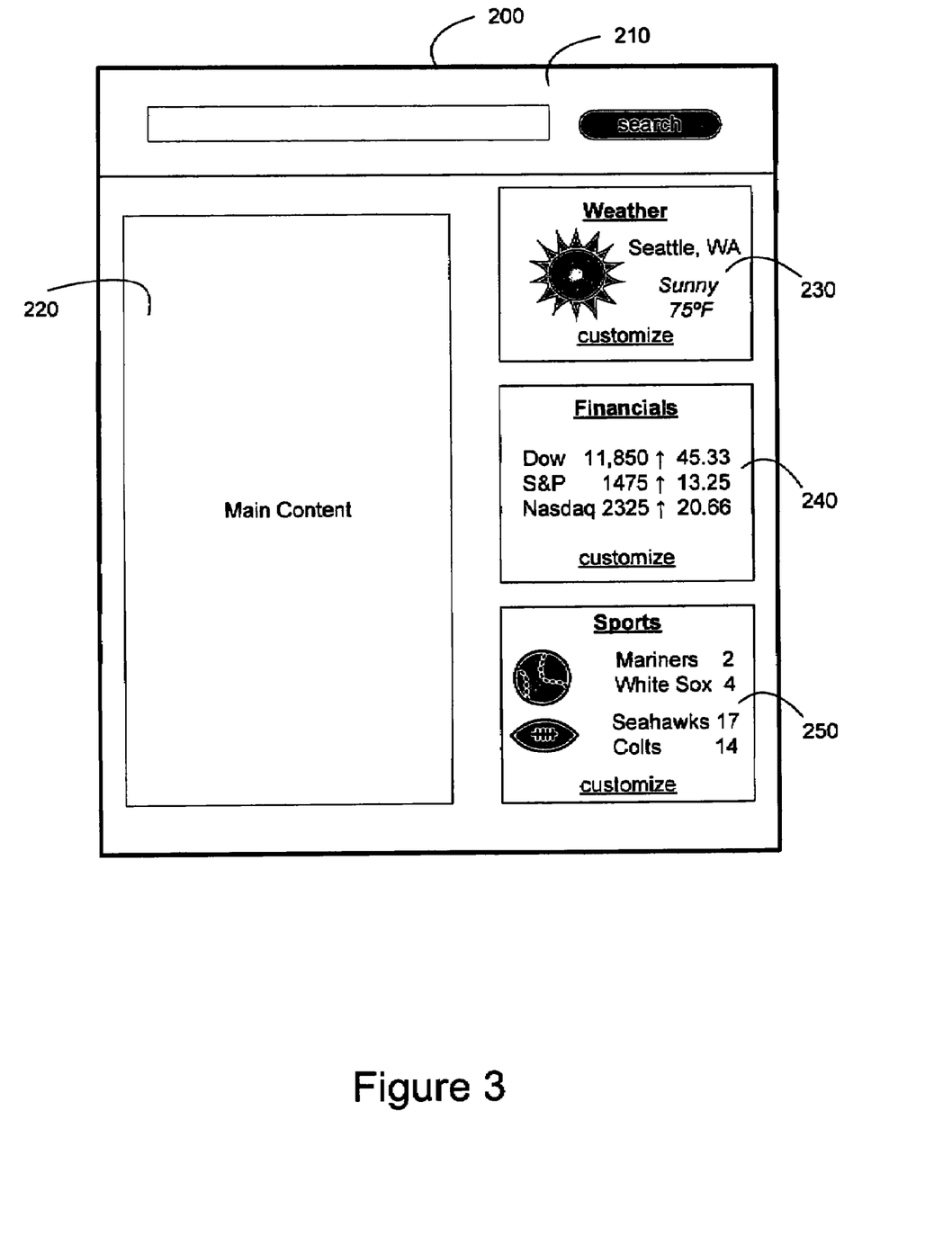
FIG. 3 is an example of a rendered web page hosting information services.

The various web pages that comprise websites 31 and 41 can host information provided by information services that are not directly part of either website 31 or website 41. Turning to FIG. 3, an exemplary web page 200 is shown as it might be displayed by a web browser 11. As can be seen, the exemplary web page 200 comprises a search area 210 for searching the website or even the whole World Wide Web. In addition, the exemplary web page 200 comprises an area 220 supporting the main content of the web page. For example, area 220 can comprise the content that was created specifically for web page 200.

Exemplary web page 200 also comprises areas 230, 240 and 250 shown displaying information that need not proprietary to web page 200, but can instead be provided by an affiliated or independent information service. For example, area 230 provides weather information such as could be obtained from public weather stations or from one of the commercial weather reporting networks. Because the weather information displayed in area 230 would be available from any number of sources, there is little reason for the author or administrator of the web page 200 to generate such information on their own. Instead, the web page 200 can be created in such a manner that the information displayed in area 230 is obtained from a weather information service and is provided to the browser 11 when the browser requests the web page 200.

In a like manner, area 240 of the web page 200 illustrates the delivery of financial information, such as stock quotes, financial market updates and the like. As with the weather information displayed in area 230, there exist a number of both public and commercial sources for all of the information displayed in area 240. Consequently, the financial information displayed in area 240 can be obtained from a financial information service and can be provided to the browser 11 when the browser requests the web page 200. Similarly, the sports scores displayed in area 250 can likewise be obtained from a sports information service and can be provided as part of the web page 200.

Returning back to FIG. 1, information service hosting devices 60 and 70 are illustrated, hosting information services 61 and 71, respectively. The information services 61 and 71 can be weather information services, such as would provide the information displayed in area 230 of web page 200 shown in FIG. 3; financial information services, such as would provide the information displayed in area 240; sports information services, such as would provide the information displayed in area 250; or any other information service. Though not illustrated in FIG. 1, to the extent that information services 61 and 71 can be used by one or more of the web pages of websites 31 and 41, the websites 31 and 41 can communicate directly to the information services 61 and 71 and do not necessarily have to route their communications through the backend computing device 50. Thus, if website 31 hosted a web page such as the illustrative web page 200, shown in FIG. 3, then website 31 could communicate directly with the information services 61 and 71 in order to obtain the information requested by the user and present it in the manner shown. Alternatively, the website 31 could rely on the backend computing device 50 in the manner illustrated in FIG. 1.

Figure 2:
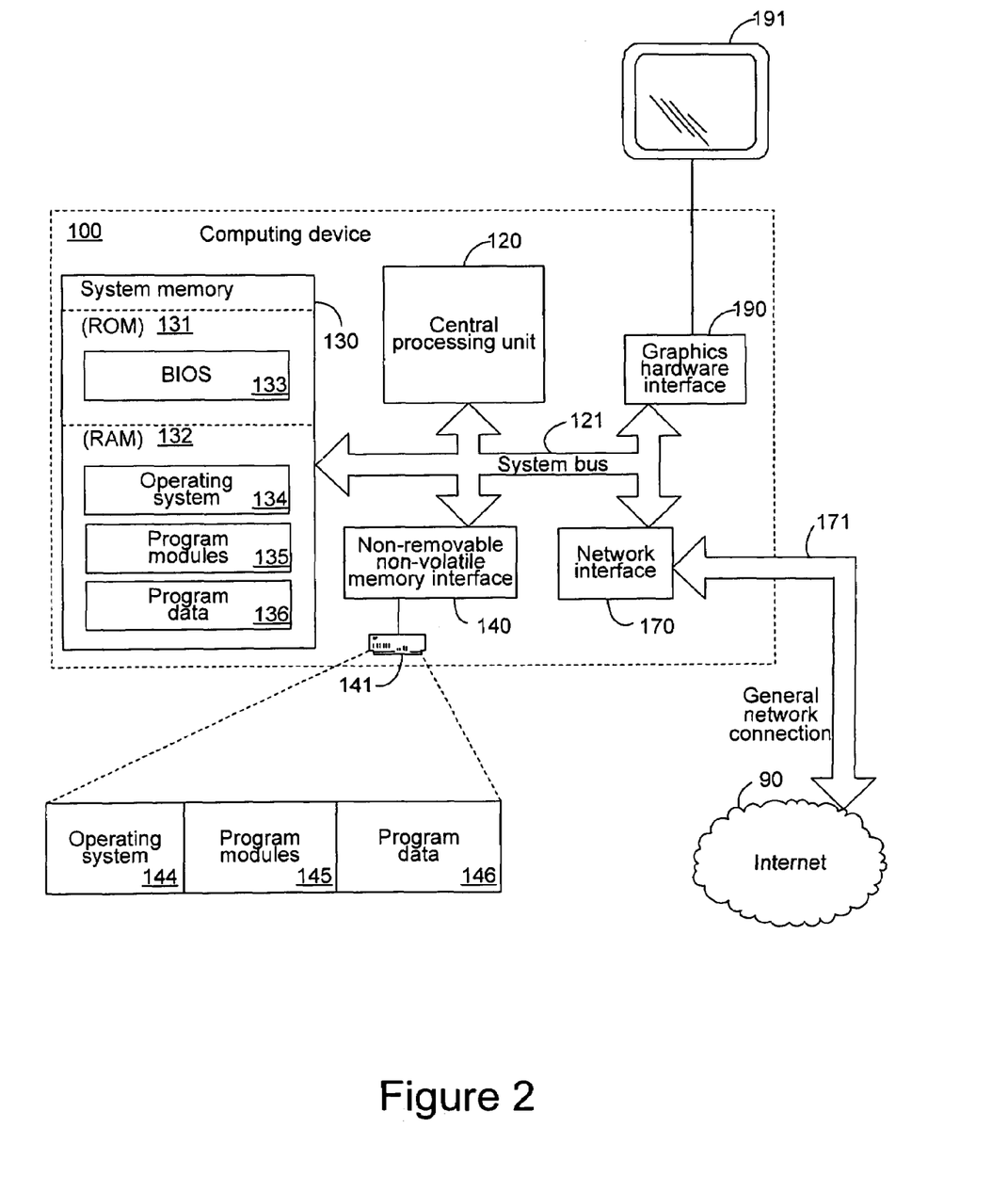
FIG. 2 is a block diagram of an exemplary computing device.

Turning to FIG. 2, an exemplary computing device 100 is illustrated. Any of the computing devices of system 99 shown in FIG. 1 can be of the form of the exemplary computing device 100, including the personal computing device 10, the website hosting devices 20, 30 and 40, the backend computing device 50, and the information service hosting devices 60 and 70.

The exemplary computing device 100 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include the Peripheral Component Interconnect (PCI) bus and various higher speed versions thereof, the Industry Standard Architecture (ISA) bus and Enhanced ISA (EISA) bus, the Micro Channel Architecture (MCA) bus, and the Video Electronics Standards Associate (VESA) bus. The computing device 100 can optionally include graphics hardware, including, but not limited to, a graphics hardware interface 190 and a display device 191.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to non-removable, non-volatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Of relevance to the descriptions below, the computing device 100 may operate in a networked environment using logical connections to one or more remote computers. For simplicity of illustration, and in conformance with the exemplary system 99 of FIG. 1, the computing device 100 is shown in FIG. 2 to be connected to the World Wide Web 90. However, the computing device 100 is not limited to any particular network or networking protocols. The logical connection depicted in FIG. 2 is a general network connection 171 that can be a local area network (LAN), a wide area network (WAN) or other networks. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

As previously described, FIG. 3 illustrates an exemplary web page 200 hosting three different types of information services; namely weather, financial and sports information services in areas 230, 240 and 250, respectively. Generally, to deliver useful information to the user, the user must first specify which information the user desires. Thus, in the case of the exemplary web page 200 shown, the user may have specified that they were interested in the weather in Seattle, Wash., that they followed Seattle Washington-based sports teams, and that they were only interested in general financial market data and did not wish to track any particular stock or mutual fund prices. Such customization could have been performed via the use of the "customize" links shown in areas 230, 240 and 250, or other customization mechanisms. However, for visitors that have not specified any particular set of information, the web page 200 can provide default values in order to avoid leaving areas 230, 240 and 250 blank and in an effort to showcase the web page's potential.

The default content provided by a web page, such as the illustrative web page 200, can be tailored to a particular visitor and can be used to instantiate a visitor profile, which can later be edited by the visitor as desired. In one embodiment, information about a visitor can be used to tailor the default content provided and provide initial values for the visitor's profile. Turning back to FIG. 1, websites 31 and 41 are illustrated as part of a cohesive web property. In many cases, such a web property provides for a singular registration process by which a visitor can become a registered user of each of the web property's websites. The singular registration process can often request a minimum of information, such as the user's name, address, date of birth and gender, which could be useful to most or all of the component websites. For example, the MSN® web property provides an initial registration process by which a user is assigned a "Passport" that can be used to log on to any MSN® website and provide that website with the user profile information contained in the user's "Passport".

A centralized profile service 51, which can be hosted by a backend computing device 50, can facilitate the provision of visitor-specific default information and the instantiation of a visitor profile. In one embodiment, the profile service 51 receives the identifying information of a visitor to a web page. The profile service 51 can then pass the visitor identifying information to the appropriate information services, such as information service 61 or 71, enabling each information service to use those elements of the visitor identifying information that are most relevant to that particular information service in order to select visitor-specific defaults. The visitor-specific defaults can be returned to the profile service 51, which can use them to instantiate a visitor profile and provide the profile to the website 31, which can use the profile to display the selected default values via the visitor's browser 11.

In another embodiment, while the profile service can still pass the visitor identifying information to the appropriate information services, and receive the visitor-specific default values from those information services, the profile service can communicate directly with the visitor's browser 11, rather than providing the instantiated visitor profile first to the website 31. For example, the website 31 can, when providing web page data to the visitor's browser 11, use programmatic aspects of the browser to enable the browser to communicate directly with the profile service 51. In one embodiment, the programmatic aspects of the browser used include Asynchronous JAvascript and XML (AJAX).

In order to avoid requesting visitor-specific defaults when the visitor is, in fact, already a registered user who already has a profile comprising previously customized information, the profile service 51 can determine which information services are hosted by the web page that the visitor has requested, and the profile service can also determine whether the visitor already has a profile for those information services. In one embodiment, the profile service 51 can use a centralized storage, such as the databases 55 and 56, to reference the relevant information. For example, database 55 can be a page registration database, and can include a registry through which individual web pages of websites 31 and 41 register the information services that they are hosting. An information service can then be added to a web page by modifying the web page code in a known manner and by also updating the registry. The information service being added can even be a new information service that was not previously available for hosting.

When a visitor requests a web page, such as from website 31, the website can request the profile service 51 to provide a visitor profile so that the website can determine which information to request from the information services and display to the visitor as part of the web page. The profile service 51 can then reference the page registration database 55 and determine which information services the visited web page hosts. The profile service 51 can also reference another database, such as the profile database 56 and determine whether the visitor already has a profile for any of the hosted information services. Although illustrated as separate databases, it will be clear to those skilled in the art that the page registration database 55 and the profile database 56 can be components of a single database, or can each represent multiple databases.

If the profile service 51 determines that the visitor is a registered user, with a profile enumerating the information the user has requested from the hosted information services, the profile service can simply provide that profile to the website 31. The website 31 can then use the profile to request the appropriate information from the hosted information services and display the information via the browser 11. However, if the profile service 51 determines that the visitor has not registered for at least one of the hosted information services, and therefore does not have a profile for that information service, it can obtain visitor-specific default information from the relevant information service and instantiate a profile based on the visitor-specific default information received. This newly instantiated profile can then be provided to the website 31 which can, as before, use the profile to request the appropriate information and display it via the browser 11.

In an alternative embodiment, the web site 31 can itself check various databases, such as profile database 56, to determine if the visitor has profiles for any or all of the information services hosted by the web page and, if the visitor does have such profiles, the website 31 need not use the profile service 51. Instead, the website 31 could limit its use of the profile service 51 to those situations where the visitor does not have a profile for some or all of the information services hosted by the requested web page.

Figure 4:
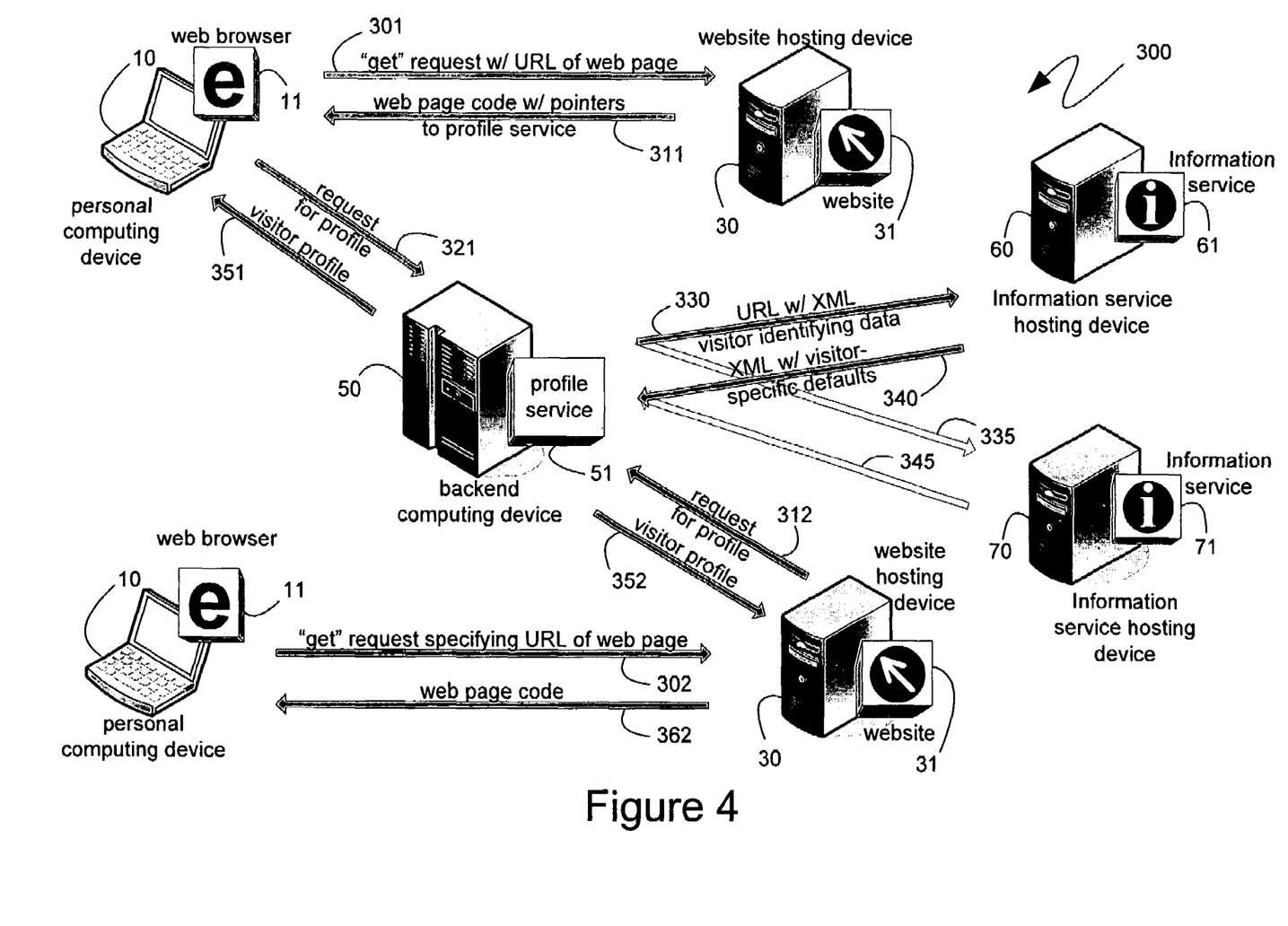
FIG. 4 is a diagram illustrating an exemplary message flow.

Turning to FIG. 4, flow diagram 300 illustrates an exemplary communicational flow for multiple contemplated embodiments. One embodiment is illustrated with reference to communications identified by numbers ending in "1", while another embodiment is illustrated with reference to communications identified by numbers ending in "2." Identifying numbers ending in "0" or "5" reference communications common to the illustrated embodiments.

Initially, a web browser 11 can request a web page as illustrated by messages 301 and 302. In one embodiment, the web browser's request takes the form of a standard HTTP "get" request. The request can be directed to the website 31 hosting the requested page via the specification of an URL and the conversion of the URL into an IP address in a manner well known to those skilled in the art. The website 31 can, depending on the circumstances, present the visitor with a login web page, identify the visitor through identifying information that may have been specified in the web browser's request, or identify the visitor through other means. For example, if the visitor had previously logged in through a companion website 41, the web browser's request for the currently requested web page could include identifying information indicating the visitor was already logged in. Alternatively, even if the visitor was not logged in, if the visitor had previously logged in, the website may be able to use information that remained on the personal computing device 10, such as data commonly referred to as a "cookie," to identify the visitor upon their return.

Another alternative, however, contemplates that the website 31 is simply not able to identify the visitor, or is able only to identify some very basic information about the visitor, such as the IP address of the personal computing device 10. At the least, the website 31 should be able to identify the market segment of the web page that the visitor requested. For example, the URL of the requested web page can specify a trailing two character country code in a manner known to those skilled in the art. For example, a request for a web page whose URL ends in ".ca" indicates that a Canadian web page was requested. Consequently, the market segment of the web page can be set to "Canada" and can be included with the visitor identifying information.

After obtaining what visitor-identifying information it can, the website 31 can determine if the visitor has previously registered for any of the information services hosted by the requested web page. In one embodiment, this determination can be made by requesting the profile service 51 to locate the appropriate profile. If the visitor already has a profile, then the website 31 can reference the profile, request the appropriate information from the information services and send the web page, with the appropriate information to the visitor's web browser 11.

However, if at least one of the information services hosted by the requested web page has not been configured by the visitor and does not, therefore, have an associated profile, the website 31 can request that the profile service 51 instantiate a profile for the visitor based on visitor-specific defaults. In one embodiment, illustrated in part by communication 312, the website 31 requests a visitor profile from the profile service 51 before transmitting the web page to the visitor's browser. In another embodiment, illustrated in part by communication 311, the website 31 can provide aspects of the web page to the visitor's browser 11 and, using the programmatic aspects of the browser, request that the browser itself communicate with the profile service 51.

In either case, communications 312 and 321 can be in a standard form conforming to the protocols of the network environment. Thus, in a World Wide Web environment, communications 321 and 321 can take the form of HTTP get requests using an appropriately constructed URL. An example of such a URL that could be used by the MSN® web properties is provided in Table 1, below.

TABLE 1 http://www.msn.com/services/coreprofile/
coreprofile.aspx?mn=GetDefaults&market=en-us Returning to the embodiment illustrated in part by communication 312, if the website 31 requests that the profile service 51 provide a profile for the visitor, and the visitor profile does not exist for one or more of the information services being hosted by the web page, the profile service can request visitor-specific default information from the information services. As described previously, some information about the visitor may be available because of a prior registration with a common registration mechanism. Such information can be provided by the profile service 51 to any or all of the information services, such as services 61 and 71, for which no visitor profile exists.

As shown in FIG. 4, the profile service 51 can provide visitor identifying information to information service 61 via message 330 and to information service 71 via an analogous message 335. In one embodiment, messages 330 and 335 are sent asynchronously, such that a slow response by any of the information services 61 or 71 need not disproportionately impact the collection of visitor-specific defaults from the remaining information services. In another embodiment, the failure of an information service to respond to messages 330 and 335 in a timely fashion causes the visitor profile for that information service to remain uninstantiated without any visitor-specific default values.

As with messages 312 and 321, messages 330 and 335 can be in a standard form conforming to the protocols of the network environment. Thus, in a World Wide Web environment, communications 330 and 335 can take the form of HTTP get requests using an appropriately constructed URL. To provide expandability, such that any collection of visitor identifying information could be communicated to the information services, an extensible mechanism can be used. In one embodiment, the extensible mechanism for specifying visitor identifying information can take the form of an appropriately constructed XML data object conforming to an expandable XML schema. The XML data object can be included as part of the appropriately constructed URL. An example of such a URL, with an XML data object, that could be used by the MSN® web properties is provided in Table 2, below.

TABLE 2 http://moneycentral.msn.com/services/stockcustomization.aspx?mn=
GetDefaults& userNodeData=<user ver="1.91" firstname="John"
lastname= "Doe" dob="1990-01-01" postcode="98052"
gender="M" updated="06-4-19 13:3:53.7421955"
accessed="06-4-19
13:3:53.7421955">&market=en-US By visually parsing the XML data included in the above exemplary message from a profile service to an information service, it can be seen that the XML data provides for the specification of the visitor's first and last names, date of birth, zip code and gender. As will be recognized by those skilled in the art, such information is traditionally collected by an average registration. However, if a more complex registration were undertaken by the visitor, the XML data could be modified and extended in a known manner. For example, if a more complex registration provided for the specification of a favorite team, such information could be provided in the URL of Table 2 by including an XML tag, such as "favteam," and assigning an appropriate value to it.

When requesting visitor-specific defaults from the information services 61 and 71, the profile service 51 can, in one embodiment, provide all of the visitor identifying information available to it. Consequently, each information service can use the visitor identifying information that may be most relevant to determining appropriate visitor-specific defaults. By providing all of the available visitor identifying information, the profile service 51 need not comprise complex algorithms to figure out which elements of the visitor identifying information are appropriate for each service. Instead, such intelligence can be distributed to the information services themselves, which can be in a better position to decide which element of the visitor identifying information is most relevant.

As an example, if information service 61 provides weather data, then it is likely that it will select a visitor-specific default based on the visitor's zip code, assuming that the visitor would be most interested in the weather information for their home city. Information such as the visitor's name or date of birth would likely be irrelevant to weather information service 61. Conversely, if information service 71 provides financial data, then it is likely that it will select a visitor-specific default based on the visitor's age, perhaps assuming that younger visitors are more likely to be interested in high-risk stocks, while older visitors are more likely to own less volatile stocks. Indeed, one of the most relevant factors may be the market segment which, as explained above, can be provided as part of the visitor's identifying information. For example, a user requesting a British financial web page is more likely to be interested in the Financial Times Stock Exchange (FTSE) index rather than the Dow Jones Industrial Average. However, unlike the weather information service 61, financial information service 71 may find the user's zip code irrelevant.

As each information service determines the visitor-specific default values that can be used to initialize the visitor's profile, those values can be returned to the profile service 51 via messages such as messages 340 and 345 illustrated in FIG. 4. As with the request messages 330 and 335, response messages 340 and 345 can be in a standard form conforming to the protocols of the network environment. Thus, in a World Wide Web environment, communications 340 and 345 can take the form of HTTP responses providing data encoded in a markup language. In one embodiment, the markup language used is XML. An example of such a response, in XML, that could be used by the MSN® web properties is provided in Table 3, below.

TABLE 3

<?xml version="1.0" encoding="utf-8" ?>
<http://moneycentral.msn.com/services/stockcustomization.aspx?mn=
GetDefaults&
amp;userNodeData=1&market=en-US##> <response>
<http://moneycentral.msn.com/services/stockcustomization.aspx?mn=
GetDefaults&
amp;userNodeData=1&market=en-US##> <service type="stock"
updated="08/24/2005 16:10:16" ver="1.0">
  <item code="$US:INDU" pro="mc" />
  <item code="$US:COMPX" pro="mc" />
  <item code="$US:INX" pro="mc" />
</service>
<http://moneycentral.msn.com/services/stockcustomization.aspx?mn=
GetDefaults&
amp;userNodeData=1&market=en-US##> <status type="OKAY">
  <code>0</code>
  <message>NoError</message>
</status>
</response>

The profile service 51 can amalgamate the responses 340 and 345 from the information services 61 and 71 in order to instantiate one or more visitor profiles for the responding information services. As indicated previously, the requests to the information services can be sent asynchronously and if the responses are not received within a pre-defined time, the profile service 51 can create a visitor profile that does not address the non-responding information service, causing the service to be queried again should the same visitor return to the hosting web page. One exemplary timeout period that can be used to achieve an appropriately responsive system is one second, though shorter or longer timeout periods can also be used.

Before saving the visitor-specific default information and instantiating a visitor profile, the profile service 51 can validate the information received in messages 340 and 345. For example, the profile service 51 can verify that all of the XML data is appropriately tagged, and that all of the XML tags are appropriately defined within the associated XML schema. The profile service can optionally check the XML data, such as by verifying that name tags do not specify numbers or that the zip code tags specify exactly five numerals.

Once verified, the visitor-specific default data received from the information services 61 and 71 can be used to instantiate one or more visitor profiles, which the profile service 51 can store for future reference. In one embodiment, the profile service 51 stores such instantiated profiles in a central storage, such as profile database 55 illustrated in FIG. 1.

After the profile service 51 has instantiated one or more visitor profiles based on the visitor-specific default information selected by the information services, the profile service 51 can return the instantiated profile to the requester. The profile can be returned in a standard form conforming to the protocols of the network environment. Thus, in a World Wide Web environment, communications and 351 and 352 can take the form of HTTP responses providing data encoded in a markup language. In one embodiment, the markup language used is XML. An example of such a response, in XML, that could be used by the MSN® web properties is provided in Table 4, below.

TABLE 4

```
<?xml version="1.0" encoding="utf-8" ?>
<http://test.beta.msn.com/services/coreprofile/coreprofile.aspx?mn=GetDefaults&
amp;market=en-us##> <response>
<http://test.beta.msn.com/services/coreprofile/coreprofile.aspx?mn=GetDefaults&
amp;market=en-us##> <user ver="1.91" firstname="" dob="" postcode="" gender=""
updated="" accessed="">
<http://test.beta.msn.com/services/coreprofile/coreprofile.aspx?mn=GetDefaults&
amp;market=en-us##> <service type="horoscope" updated="06-4-19 13:3:53.7421955"
ver="1.0">
   <item pro="mc" id="cap" />
   </service>
<http://test.beta.msn.com/services/coreprofile/coreprofile.aspx?mn=GetDefaults&
amp;market=en-us##> <service type="LocalNews" updated="06-4-19 13:3:53.7421955"
ver="1.0">
<http://test.beta.msn.com/services/coreprofile/coreprofile.aspx?mn=GetDefaults&
amp;market=en-us##> <sub type="localnews">
   <data pro="ln:wnbc" />
   </sub> <http://test.beta.msn.com/services/coreprofile/coreprofile.aspx?
mn=GetDefaults&market=en-us##> <sub type="cityguides">
   <data pro="lg:newyorkny" />
   </sub>
   </service> <http://test.beta.msn.com/services/coreprofile/coreprofile.aspx?
mn=GetDefaults&market=en-us##> <service type="weather" updated="06-4-19
13:3:53.7421955" ver="1.0">
<http://test.beta.msn.com/services/coreprofile/coreprofile.aspx?mn=GetDefaults&
amp;market=en-us##> <sub type="exp">
   <item id="wc:USNY0996" pro="wc" />
   </sub>
   </service>
   </user>
<http://test.beta.msn.com/services/coreprofile/coreprofile.aspx?mn=GetDefaults&
amp;market=en-us##> <status type="OKAY">
   <code>0</code>
   <message>NoError</message>
   </status>
   </response>
```

In one embodiment, partially illustrated by message 312, the website 31 requested the profile and, consequently, the profile service 51 returns the instantiated visitor profile to the website via message 352. The website 31 can then use the profile to request the specified information from the information services and then generate the web page for transmission to the visitor. For example, if the profile specifies that the visitor's default weather should be the weather for Seattle, Wash., the website 31 can request the information service 61 to provide the current weather in Seattle for transmission to the visitor as part of the web page. Once the website 31 has received the requested information from the information services, it can generate the web page and send it to the user's web browser 11 via message 362.

In an alternative embodiment, partially illustrated by message 321, the web browser 11 requested the profile and, consequently, the profile service 51 returns the instantiated visitor profile to the web browser via message 351. The web browser 11 can then use the profile to request the specified information from the information services and then generate the web page on the personal computing device 10.

Figure 5:
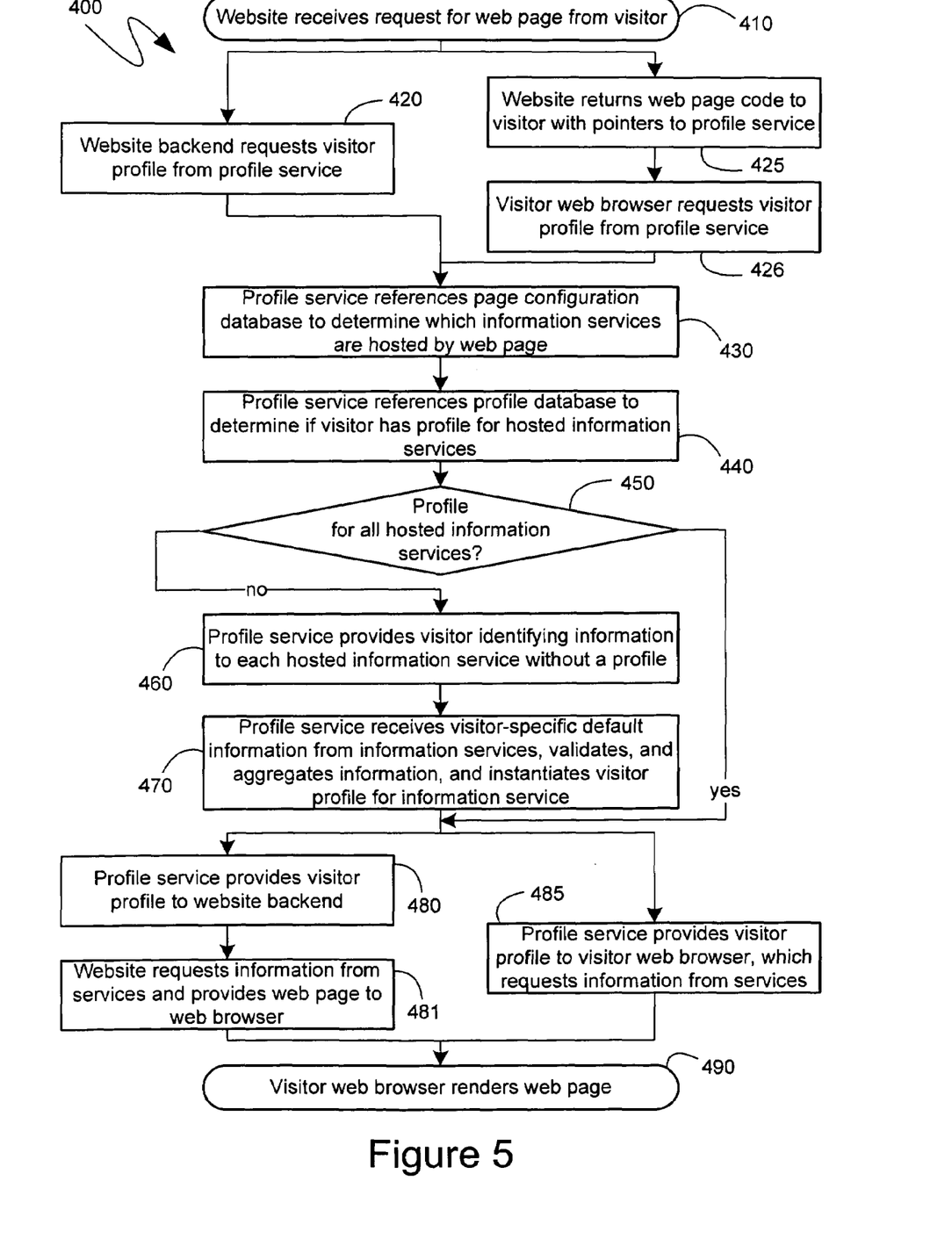
FIG. 5 is a flowchart illustrating an exemplary process for obtaining visitor-specific default values.

Turning to FIG. 5, flow diagram 400 further illustrates the above described mechanisms. At step 410, the process is initiated when a website receives a request, from a visitor, for a web page that is hosing one or more information services. In one embodiment, the website can handle communications with the profile service, while in an alternative embodiment the website directs the visitor's web browser to communicate with the profile service. Thus, at step 420, the website requests the visitor's profile from the profile service, while at alternative steps 425 and 426, the website provides the requested web page to the visitor's web browser and directs the web browser to communicate with the profile service and the web browser proceeds to request the visitor's profile from the profile service.

Once the profile service receives a request for the visitor's profile, either from the web browser or from the website, it can, in step 430, reference a database, such as a page configuration database, to determine which information services are hosted by the web page. In one embodiment, the profile service reads the database on a period basis to detect changes, but otherwise references an in-memory copy for faster access on a per-request basis. After determining which information services are being hosted by the web page at step 430, the profile service can determine if the visitor has a profile for these information services at step 440, such as by reading a profile database. If the visitor's profile addresses each of the hosted information services, then the decision at step 450 causes the profile service to skip steps 460 and 470.

However, if the visitor's profile is uninstantiated for at least one of the hosted information services, the profile service can provide what visitor identifying information it has to the hosted information services that are not addressed by the visitor's current profile at step 460. In addition, at step 460, the profile service can request, asynchronously, that the hosted information services that are not addressed by the visitor's current profile return visitor specific default information that can be used to instantiate the visitor's profile. At step 470, the profile service receives the visitor specific default information from the information services and validates the information, such as by verifying that it complies with the schema and that the values are within expected ranges. Step 470 further encompasses the profile service aggregating the information from the information services and instantiating a visitor profile based on that information.

If step 420 was performed, then the profile service can provide the visitor profile to the website at step 480 and the website can use the profile at step 481 to request the appropriate information from the information services and provide the completed web page to the web browser. At step 490, the visitor web browser renders the web page for the visitor. Conversely, if steps 425 and 426 were performed, the profile service, at step 485, can provide the visitor's profile to the web browser, enabling the web browser to request the appropriate information from the information services and, at step 490, completed the rendering of the web page.

As can be seen from the above descriptions, the profile service enables each information service to customize the visitor-specific default selection process while itself avoiding the programmatic complexities inherent in the visitor-specific default selection process. In view of the many possible variations of the subject matter described herein, we claim as our invention all such embodiments as may come within the scope of the following claims and equivalents thereto.

We claim:

1. A computer-readable storage memory comprising computer-executable instructions that when executed by a processor on a computer perform a method comprising:
   receiving a notification of a request by a user for a web page of a website, the website hosted by a web hosting device, the request generated by the user through a user computing device;
   generating, using a profile service, user identifying information of the user based upon user data, the profile service remote from the web hosting device, the user computing device, and a web service provider used by the webpage;
   determining, using the profile service, the web service provider used by the web page by consulting a page registration database, the page registration database correlating web pages of the website with web service providers used by web pages of the website;
   determining, using the profile service, whether a user profile correlating the user with the web service provider exists by consulting a profile database;
   upon determining a user profile does not exist, sending, using the profile service, the user identifying information to the web service provider;
   receiving, using the profile service, visitor-specific default parameters from the web service provider, the visitor-specific default parameters generated by the web service provider based upon the user identifying information sent by the profile service;
   generating, using the profile service, the user profile correlating the user with the web service provider based upon the visitor-specific default parameters;
   sending, using the profile service, the user identifying information to a second web service provider;
   receiving, using the profile service, second visitor-specific default parameters from the second web service provider, the second visitor-specific default parameters generated by the second web service provider based upon the user identifying information sent by the profile service;
   incorporating, using the profile service, the second visitor-specific default parameters into the user profile,
      the receiving second visitor-specific default parameters comprising:
         limiting the receiving of the second visitor-specific default parameters to a pre-defined period of time, where expiration of the pre-defined period of time before receiving the second visitor-specific default parameters from the second web service provider causes the user profile to not comprise the second visitor-specific default parameters from the second web service provider; and
   sending, using the profile service, the user profile to at least one of a web browser of the user and the website.

2. The computer-readable storage memory of claim 1, comprising:
   periodically referencing the page registration database to determine whether a new web service provider has been added for the web pages of the website.

3. The computer-readable storage memory of claim 2, comprising:
   upon determining a new web service provider exists within the page registration database, providing user identifying information to the new web service provider.

4. The computer-readable storage memory of claim 3, comprising:
   receiving new visitor-specific default parameters from the new web service provider, the new visitor-specific default parameters generated by the new web service provider based upon the user identifying information; and
   generating a second user profile correlating the user with the new web service provider based upon the new visitor-specific default parameters.

5. The computer-readable storage memory of claim 1, comprising:
   sending, using the profile service, the user identifying information to the first web service provider and the second web service provider asynchronously.

6. The computer-readable storage memory of claim 1, wherein the user identifying information is based upon at least one of a cookie, a companion website registration, prior registration of a related web property, previous web browsing data, IP address, web browser request data, and specified market.

7. The computer-readable storage memory of claim 1, comprising:
   providing the user profile to the web service provider; and
   receiving customized content from the web service provider, the customized content generated by the web service provider based upon the user profile.

8. The computer-readable storage memory of claim 1, wherein the user identifying information is generated without user input at the time the request is made and without historically received prompted-for user input.

9. A method comprising:
   receiving notification of a request by a user for a web page of a website, the website hosted by a web hosting device, the request generated by the user through a user computing device;
   generating, using a profile service, user identifying information of the user based upon user data, the profile service remote from the web hosting device, the user computing device, and a web service provider used by the webpage;
   determining, using the profile service, the web service provider used by the web page by consulting a page registration database, the page registration database correlating web pages of the website with web service providers used by web pages of the website;
   determining, using the profile service, whether a user profile correlating the user with the web service provider exists by consulting a profile database;

upon determining a user profile does not exist, sending, using the profile service, the user identifying information to the web service provider;

receiving, using the profile service, visitor-specific default parameters from the web service provider, the visitor-specific default parameters generated by the web service provider based upon the user identifying information sent by the profile service;

generating, using the profile service, a user profile correlating the user with the web service provider based upon the visitor-specific default parameters received from the web service provider;

sending, using the profile service, the user identifying information to a second web service provider;

receiving, using the profile service, second visitor-specific default parameters from the second web service provider, the second visitor-specific default parameters generated by the second web service provider based upon the user identifying information sent by the profile service;

incorporating, using the profile service, the second visitor-specific default parameters into the user profile,
the receiving second visitor-specific default parameters comprising:
limiting the receiving of the second visitor-specific default parameters to a pre-defined period of time, where expiration of the pre-defined period of time before receiving the second visitor-specific default parameters from the second web service provider causes the user profile to not comprise the second visitor-specific default parameters from the second web service provider; and sending, using the profile service, the user profile to at least one of a web browser of the user and the website.

10. The method of claim 9, the generating comprising:
generating, using the profile service, the user identifying information of the user based upon at least one of a cookie, a companion website registration, prior registration of related web property, previous web browsing data, IP address, web browser request data, and specified market.

11. The method of claim 9, the sending comprising:
sending, using the profile service, the user identifying information using an XML data object within a URL to the web service provider.

12. The method of claim 9, wherein the user identifying information is generated without user input at the time the request is made and without historically received prompted-for user input.

13. A computing system comprising:
a microprocessor;
memory communicatively coupled to the microprocessor; and
a profile service implemented at least in part with the microprocessor and configured to:
receive notification of a request by a user for a web page of a website, the website hosted by a web hosting device, the request generated by the user through a user computing device;
generate user identifying information of the user based upon user data, the profile service remote from the web hosting device, the user computing device, and a web service provider used by the webpage;
determine the web service provider used by the web page by consulting a page registration database, the page registration database correlating web pages of the website with web service providers used by web pages of the website;
determine whether a user profile correlating the user with the web service provider exists by consulting a profile database;
upon determining a user profile does not exist, send the user identifying information to the web service provider;
receive visitor-specific default parameters from the web service provider, the visitor-specific default parameters generated by the web service provider based upon the user identifying information sent by the profile service;
generate a user profile correlating the user with the web service provider based upon the visitor-specific default parameters;
send the user identifying information to a second web service provider;
receive second visitor-specific default parameters from the second web service provider, the second visitor-specific default parameters generated by the second web service provider based upon the user identifying information sent by the profile service;
incorporate the second visitor-specific default parameters into the user profile;
limit the receiving of the second visitor-specific default parameters to a pre-defined period of time, where expiration of the pre-defined period of time before receiving the second visitor-specific default parameters from the second web service provider causes the user profile to not comprise the second visitor-specific default parameters from the second web service provider; and
send the user profile to at least one of a web browser of the user and the website.

14. The computing system of claim 13, the profile service configured to:
generate the user identifying information based upon at least one of a cookie, a companion website registration, prior registration of a related web property, previous web browsing data, IP address, web browser request data, and specified market.

* * * * *

UNITED STATES PATENT AND TRADEMARK OFFICE
CERTIFICATE OF CORRECTION

| | | |
|---|---|---|
| PATENT NO. | : 7,788,321 B2 | Page 1 of 1 |
| APPLICATION NO. | : 11/512491 | |
| DATED | : August 31, 2010 | |
| INVENTOR(S) | : Kostyantyn V. Korovkin et al. | |

It is certified that error appears in the above-identified patent and that said Letters Patent is hereby corrected as shown below:

In column 17, line 40, in Claim 10, after "of" insert -- a --.

Signed and Sealed this
Twenty-fourth Day of May, 2011

David J. Kappos
*Director of the United States Patent and Trademark Office*